United States Patent
Nefzger et al.

(10) Patent No.: US 8,481,606 B2
(45) Date of Patent: *Jul. 9, 2013

(54) PROCESS FOR THE PRODUCTION OF POLYESTER POLYOLS WITH LOW VOLUMES OF DIOXANE WASTE

(75) Inventors: Hartmut Nefzger, Pulheim (DE); Erika Bauer, Jüchen (DE); Johannes Van de Braak, Hennef (DE); Jürgen Schloβmacher, Bergheim (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/127,293

(22) PCT Filed: Oct. 24, 2009

(86) PCT No.: PCT/EP2009/007626
§ 371 (c)(1),
(2), (4) Date: Jun. 7, 2011

(87) PCT Pub. No.: WO2010/051917
PCT Pub. Date: May 14, 2010

(65) Prior Publication Data
US 2011/0237697 A1     Sep. 29, 2011

(30) Foreign Application Priority Data
Nov. 6, 2008  (DE) .......................... 10 2008 056 147

(51) Int. Cl.
*C08J 9/04*   (2006.01)
*C08G 18/42*  (2006.01)
*C07C 69/003* (2006.01)
*C07C 69/00*  (2006.01)
*C07C 67/08*  (2006.01)

(52) U.S. Cl.
USPC ..................... 521/172; 428/319.1; 428/425.8; 521/902; 560/89; 560/98; 560/103; 560/112

(58) Field of Classification Search
USPC ....... 428/319.1, 425.8; 521/172, 902; 560/89, 560/98, 103, 112
See application file for complete search history.

(56) References Cited

U.S. PATENT DOCUMENTS 6,359,022 B1 *  3/2002  Hickey et al. ................. 521/114
2005/0257893 A1 * 11/2005 Rub et al. ...................... 156/516
2007/0093632 A1 *  4/2007 Ghesquiere .................... 528/44

OTHER PUBLICATIONS

Houben-Weyl, Methoden der Orgenischem Chemie. vol. XIV/2, Makromolekulare Stoffe, Thieme Verlag Stuttgart, ed. E. Mueller, pp. 1-47, 1963.

* cited by examiner

*Primary Examiner* — Rabon Sergent
(74) *Attorney, Agent, or Firm* — N. Denise Brown

(57) ABSTRACT

The invention relates to the production and use of polyester polyols, formed from at least one carboxylic acid anhydride and ethylene glycol, wherein a specialized reaction control substantially suppresses the formation of 1,4-dioxane from diethylene glycol.

14 Claims, No Drawings

PROCESS FOR THE PRODUCTION OF POLYESTER POLYOLS WITH LOW VOLUMES OF DIOXANE WASTE

BACKGROUND OF THE INVENTION

The present invention relates to the production and use of polyester polyols synthesized from at least one carboxylic acid anhydride and diethylene glycol, wherein the formation of 1,4-dioxane from diethylene glycol is substantially suppressed by a special reaction procedure.

Polyester polyols are an important constituent of many foamed and unfoamed polyurethane systems. Polyester polyols, as used for forming polyurethanes, have a large predominance of hydroxyl end groups available for further reaction with isocyanate groups. The molecular weight of polyester polyols is typically in the range 200-5000 dalton. They are mainly produced by the polycondensation of polycarboxylic acids, especially dicarboxylic acids, with polyols, especially diols, whereby carboxyl and hydroxyl groups are reacted to form ester groups under dehydrating conditions. An alternative possibility is to use polycarboxylic acid anhydrides, e.g. phthalic anhydride.

Dehydrating conditions can be achieved e.g. by the application of a vacuum, by the use of an inert gas stream to blow out the water of reaction, or by azeotropic purging with an entraining agent (Houben-Weyl, Methoden der organischen Chemie, volume 14/2, Makromolekulare Stoffe, Thieme Verlag Stuttgart, ed. E. Müller, pp 1-47, 1963).

Those skilled in the art are aware that when the aromatic acid phthalic acid, normally used in the form of phthalic anhydride, is esterified with diethylene glycol, 1,4-dioxane is formed as an unwanted by-product. During production in industrial plants, the dioxane formed is discharged together with the water of reaction and subsequently has to be degraded, e.g. in waste treatment plants, or concentrated and then incinerated. This additional process step increases the costs of polyester polyol production.

The 1,4-dioxane formed as a by-product also has the effect of reducing the yield of the desired product, since, as described, part of the diethylene glycol used is removed from the reaction mixture in the form of 1,4-dioxane instead of being incorporated into the polyester produced. The formation of 1,4-dioxane therefore constitutes serious economic disadvantage.

Furthermore, the amount of 1,4-dioxane that is allowed to be produced by a production plant can be limited by specified concessions. In these cases, a limit on the amount of dioxane thus leads indirectly to a limit on the production capacity of a polyester polyol production plant.

SUMMARY OF THE INVENTION

One object of the present invention is therefore to provide a process for the production of polyester polyols, synthesized from at least one carboxylic acid anhydride and diethylene glycol, which overcomes the disadvantages of the state of the art.

One particular object of the present invention, in the production of polyester polyols from at least one carboxylic acid anhydride and diethylene glycol, is to limit the amount of dioxane formed relative to the amount of diethylene glycol used, it being possible for the amount of dioxane to be limited to less than 8 g, preferably to less than 6 g, per kg of diethylene glycol used.

Another object of the present invention, in the production of polyester polyols from at least one carboxylic acid anhydride and diethylene glycol, is to reduce the amount of dioxane formed relative to the amount of polyester polyol formed, it being possible for the amount of dioxane to be limited to less than 4 g, preferably to less than 3 g, per kg of polyester polyol formed.

The aforementioned object is achieved by a process for the production of polyester polyols wherein at least one carboxylic acid anhydride (A), diethylene glycol (B) and at least one $C_2$-$C_4$ glycol (C) and at least one-aliphatic $C_5$-$C_{12}$ dicarboxylic acid (D), or at least one $C_5$-$C_{10}$ glycol (E) and at least one $C_4$ dicarboxylic acid (F), are mixed, the molar ratio of component (B) to (A) being in the range 1.5:1-1.1:1, and the proportion by weight of components (A) and (B), based on the weight of all the components of the mixture, being in the range 66-95 wt. %.

The amounts of components (C), (D), (E) and (F) are chosen so that the amounts of all the components of the mixture, (A), (B), (C) and (D) or (E) and (F), add up to 100 wt. %.

DETAILED DESCRIPTION OF THE INVENTION

In one preferred embodiment, the carboxylic acid anhydride (A) is aromatic.

Preferably, the carboxylic acid anhydride (A) is selected from the group comprising phthalic anhydride, trimellitic anhydride and pyromellitic anhydride. Particularly preferably, the carboxylic acid anhydride is phthalic anhydride.

By replacing small amounts of aromatic dicarboxylic acids with an equivalent amount of an aliphatic dicarboxylic acid (D) or (F) and replacing small amounts of diethylene glycol with an equivalent amount of a glycol (C) or (E), the volume of dioxane waste in the production of polyester polyols is reduced well beyond the extent to be expected from the dilution effect. The properties of the polyester polyol produced remain almost unchanged, i.e. polyester polyols produced by the process according to the invention have the same properties as corresponding polyester polyols produced without the addition of an aliphatic dicarboxylic acid (D) or (F) and without the addition of a glycol (C) or (E).

Preferably, the $C_2$-$C_4$ glycol (C) is selected from the group comprising ethylene glycol, 1,3-propanediol, 2-methyl-1,3-propanediol and 1,2-propanediol. Particularly preferably, the $C_2$-$C_4$ glycol (C) is ethyleneglycol.

Preferably, the aliphatic $C_5$-$C_{12}$ dicarboxylic acid (D) is selected from the group comprising glutaric acid, adipic acid, pimelic acid, suberic acid, azelaic acid, sebacic acid, undecanedioic acid and dodecanedioic acid. Particularly preferably, the $C_5$-$C_{12}$ dicarboxylic acid (D) is adipic acid or sebacic acid.

Preferably, the $C_5$-$C_{10}$ glycol (E) is selected from the group comprising 1,5-pentanediol, 3-methyl-1,5-pentanediol, 1,6-hexanediol and 1,8-octanediol. Particularly preferably, the $C_5$-$C_{10}$ glycol (E) is 3-methyl-1,5-pentanediol or 1,6-hexanediol.

Preferably, the $C_4$ dicarboxylic acid (F) is selected from the group comprising succinic acid, fumaric acid and maleic acid. Particularly preferably, the $C_4$ dicarboxylic acid (F) is succinic acid.

Preferably, the molecular weight of the polyester polyol obtained is in the range 750-350, particularly preferably in the range 620-370, Preferably, the OH number of the polyester polyol obtained is in the range 150-320 g KOH/kg, preferably in the range 180-300 g KOH/kg.

The OH number is determined by first reacting the hydroxyl end groups in a sample of the polyester polyol with a defined excess of an anhydride, e.g. acetic anhydride, hydrolysing the excess anhydride and measuring the content of free carboxyl groups by direct titration with a strong base, e.g. sodium hydroxide. The difference between the carboxyl groups introduced in the form of the anhydride and the carboxyl groups found experimentally is a measure of the number of hydroxyl groups in the sample. If this value is corrected for the number of carboxyl groups contained in the original sample as a result of the esterification not being quite complete, i.e. for the acid number, the OH number is obtained. The titrations, usually performed with sodium hydroxide, are converted to the equivalent amount of potassium hydroxide so that the acid and hydroxyl numbers are both in the units g KOH/kg. The following mathematical relationship exists between hydroxyl number (OH#) and number-average molecular weight (M): $M=(56100*F)/OH\#$, where F denotes the number-average functionality and can be derived in good approximation from the formulation.

Preferably, the viscosity of the polyester polyol obtained is in the range 400-3000 mPas, preferably in the range 450-1500 mPas, at a temperature of 50° C.

The viscosity is determined by means of a cone-and-plate viscometer, e.g. Physica MCR 51 from Anton Paar, extrapolating to zero shear rate. Polyols according to the invention are as far as possible not structurally viscous.

Preferably, the proportion by weight of components (A) and (B), based on the weight of all the components, is in the range 70-85 wt. %.

Preferably, the polyester polyols obtained have an acid number of 0.5 to 3.5 g KOH/kg.

The functionality of the polyester polyols obtained is preferably in the range 1.9-3. Functionalities of more than 2 are obtained by carrying out the esterification with the concomitant use of a proportion of structural units with functionalities of more than 2, e.g. triols or tetraols and/or tri- or tetracarboxylic acids and/or trifunctional hydroxycarboxylic acids. Typical representatives are glycerol, 1,1,1-trimethylolpropane, pentaerythritol, trimellitic acid, trimesic acid, malic acid, tartaric acid, citric acid, dimethylolpropionic acid, etc. Preferably, the functionality can be adjusted to the range 2.0-2.3 by using glycerol or 1,1,1-trimethylolpropane. In this way the viscosity measured at 25° C. deviates by less than 20% from the value measured for a polyester polyol of the same functionality and hydroxyl number which is synthesized exclusively from phthalic anhydride and diethylene glycol, apart from the functionality-increasing component (e.g. 1,1,1-trimethylolpropane).

Preferably, to produce the polyester polyols according to the invention, a vacuum process is carried out at pressures in the range from normal pressure to a final vacuum of 5 mbar, preferably of 10 mbar, and at temperatures in the range 100-230° C., preferably 180-215° C.

Preferably, the process for the production of the polyester polyols according to the invention is carried out by placing all the components simultaneously in a reactor and first performing a condensation under normal pressure, using an inert gas, at temperatures in the range 100-230° C., particularly preferably at temperatures in the range 180-215° C., until no more water of reaction distils off, then reducing the pressure to less than 20 mbar over a period of 1 to 4 hours, optionally after the addition of an esterification catalyst, and finally performing a polycondensation, at temperatures in the range 180-215° C. and under a full water-jet vacuum, until the acid number is below 5 g KOH/kg.

Any of the catalysts known to those skilled in the art can be used to produce the polyester polyols according to the invention. It is preferable to use tin(II) chloride and titanium tetraalkoxylates.

The components are preferably reacted in bulk to produce the polyester polyol according to the invention.

Alternatively, the polyester polyols can also be produced by the nitrogen blowing process, wherein the condensate is discharged from the reaction vessel, by a nitrogen stream (J. H. Saunders and H. T. Frisch in Polyurethanes: Chemistry and Technology, Part I. Chemistry, Interscience, published John Wiley and Sons, New York 1962, page 45).

The present invention also provides a process for the production of a PUR-PIR foam, comprising the following steps:
a) reacting a polyester polyol, obtainable by the process described above, with
b) a component containing polyisocyanate,
c) a blowing agent,
d) one or more catalysts, and
e) optionally flameproofing agents and/or other auxiliary substances and additives.

A component containing polyisocyanate includes polyisocyanates.

The polyisocyanates used are isocyanates conventionally employed in the field of polyurethanes. Suitable isocyanates are generally polyvalent aliphatic, cycloaliphatic, arylaliphatic and aromatic isocyanates. It is preferable to use aromatic di- and polyisocyanates. Preferred examples are 2,4- and 2,6-toluylene diisocyanate and any desired mixtures of these isomers, 2,2'-, 2,4'- and 4,4'-diphenylmethane diisocyanate and any desired mixtures of these isomers, and mixtures of 2,2'-, 2,4'- and 4,4'-diphenylmethane diisocyanates (binuclear MDI) and polyphenylene polymethylene polyisocyanates (MDI). Alternatively, it is also possible to use mixtures of toluylene diisocyanates and MDI.

Generally known compounds with a chemical or physical action can be used as blowing agents. Water can preferably be used as a blowing agent with a chemical action. Examples of physical blowing agents are (cyclo)aliphatic hydrocarbons having 4 to 8 carbon atoms, as well as HFCs and HCFCs which vaporize under the conditions of polyurethane formation. In one preferred embodiment, pentane and cyclopentane, and mixtures of pentane and cyclopentane, are used as blowing agents.

The amount of blowing agents used depends predominantly on the required density of the foams. In general, water is used in an amount of 0 to 5 wt. %, preferably of 0.1 to 3 wt. %, based on the total formulation. It is generally also possible to use 6 to 8 wt. %, preferably 0.1 to 5 wt. %, of a blowing agent with a physical action. Another blowing agent which can be used is carbon dioxide, which is preferably dissolved as a gas in the starting components.

The catalysts used for the production of the polyurethane or polyisocyanurate foams according to the invention are the conventional, known catalysts for forming polyurethanes or polyisocyanurates, e.g. organic tin compounds such as tin diacetate, tin dioctanoate or dibutyltin dilaurate, and/or strongly basic amines such as 2,2,2-diazabicyclooctane, triethylamine or, preferably, triethylenediamine or bis(N,N-dimethylaminoemyl) ether, and, for catalysis of the PIR reaction, potassium acetate and aliphatic quaternary ammonium salts.

The catalysts are preferably used in an amount of 0.1 to 3 wt. %, preferably of 0.5 to 2 wt. %, based oh the total weight of all the components.

The reaction of the aforementioned components optionally takes place in the presence of auxiliary substances and/or additives, examples being cell regulators, release agents, pigments, reinforcing agents such as glass fibres, surface-active compounds and/or stabilizers for inhibiting oxidative, thermal, hydrolytic or microbial degradation or ageing. The polyurethane foams conventionally have a density of 20 to 250 g/l, advantageously of 25 to 150 g/l, particularly preferably of 30 to 100 g/l and very particularly preferably of 35 to 75 g/l.

The polyurethane foam according to the invention is generally produced by reacting all the components, mixed via conventional high- or low-pressure mixing heads, in amounts such that the equivalent ratio of NCO groups to the sum of the reactive hydrogen atoms in the case of pure PUR foams is in the range 1:0.8-1:1.60, preferably in the range 1:0.9-1:1.15, a ratio of 1:1 corresponding to an NCO index of 100.

In the case of PUR-PIR foams, the equivalent ratio of NCO groups to the sum of the reactive hydrogen atoms is in the range 1:1.60-1:5.0, preferably 1:2.0-1:4.0.

The present invention also provides the use of polyester polyols, produced by the process described above, for the production of polyurethane. Polyurethane is a versatile material used in many areas. By virtue of the great diversity of the raw materials that can be used, it is possible to make products with a very wide variety of properties, e.g. rigid foams for insulation, flexible block foams for mattresses, flexible moulded foams for car seats and cushions, acoustic foams for sound insulation, thermoplastic foams, shoe foams or microcellular foams, as well as compact casting systems and thermoplastic polyurethanes.

The present invention also provides the use of a PUR or PIR foam, obtained by the process, described above, for the production of metal composite elements.

Metal composite elements are sandwich composite elements consisting of at least two facings and a core layer in between. In particular, metal-foam composite elements consist of at least two facings made of metal and a core layer made of foam, e.g. a rigid polyurethane (PUR) foam or a rigid polyurethane-polyisocyanurate (PUR-PIR) foam. Such metal-foam composite elements are adequately known from the state of the art and are also called metal composite elements. There can be other layers between the core layer and the facings. For example, the facings can be coated, e.g. with a lacquer.

Examples of the use of such metal composite elements are flat or ruled wall elements and profiled roof elements for the construction of industrial halls and cold stores, as well as for lorry superstructures, hall doors or transport containers. These metal composite elements can be produced continuously or batchwise. Devices for continuous production are known e.g. from DE 1 609 668 A or DE 1 247 612 A.

EXAMPLES

List of the Raw Materials Used in the Examples

| | |
|---|---|
| Phthalic anhydride (PA): | Technical-grade PA from Lanxess |
| Adipic acid: | Adipic acid from BASF |
| Diethylene glycol (DEG): | DEG from Ineos |
| Ethylene glycol (EG): | EG from Ineos |
| Tin(II) chloride dihydrate: | from Aldrich |
| Analytical methods used: | |
| Viscometer: | MCR 51 from Anton Paar |

A) Production of the Polyester Polyols

Example 1(C)

Standard Process, Comparison

Under a nitrogen blanket at 140° C., 1437 g (9.71 mol) of PA were placed in a 4-litre 4-necked flask equipped with a heating mantle, a mechanical stirrer, an internal thermometer, a 40 cm packed column, a column head, a descending jacketed coil condenser, a receiver cooled with dry ice, and a diaphragm vacuum pump, and 1737.3 g (16.39 mol) of DEG were added slowly. After 1 hour the temperature was raised to 190° C., 65 mg of tin(II) chloride dihydrate were stirred in, the pressure was reduced to 700 mbar and the reaction temperature was raised to 215° C. Over a: further 5 hours the pressure was reduced continuously to a final value of 160 mbar and the reaction was brought to completion in a total operating time of 26 h. Distillates were collected throughout the reaction in a receiver cooled with dry ice. The amount of 1,4-dioxane formed was determined by gas chromatography: 34.3 g.

Analysis of the Polyester:
    Hydroxyl number: 238.2 mg KOH/g
    Acid number: 1.7 mg KOH/g
    Viscosity: 10,400 mPas (25° C.), 890 mPas (50° C.), 180 mPas (75° C.)
    Amount of polyester polyol formed: 2965 g
    Amount of dioxane based on the amount of polyester polyol: 34.3 g/2.965 kg=11.6 g dioxane/kg polyester
    Amount of dioxane based on the amount of DEG used: 34.3 g/1.738 kg=19.7 g dioxane/kg DEG Example 2(C)

Standard Process, Lower Temperature, Comparison

Under a nitrogen blanket at 140° C., 1437 g (9.71 mol) of PA were placed in an apparatus according to Example 1 and 1737.3 g (16.39 mol) of DEG were added slowly. After 1 hour the temperature was raised to 180° C., 65 mg of tin(II) chloride dihydrate were stirred in and the pressure was reduced to 700 mbar. Over a further 5 hours the pressure was reduced continuously to a final value of 45 mbar. The temperature was raised to 200° C. and the pressure to 115 mbar and the reaction was brought to completion in a total operating time of 27 h. Distillates were collected throughout the reaction in a receiver cooled with dry ice. The amount of 1,4-dioxane formed was determined by gas chromatography: 17.6 g.

Analysis of the Polyester:
    Hydroxyl number: 234.5 mg KOH/g
    Acid number: 1.6 mg KOH/g
    Viscosity: 11,300 mPas (25° C.), 930 mPas (50° C.), 190 mPas (75° C.)
    Amount of polyester polyol formed: 2982 g
    Amount of dioxane based on the amount of polyester polyol: 17.6 g/2.982 kg=5.9 g dioxane/kg polyester
    Amount of dioxane based on the amount of DEG used: 1.7.6 g/1.738 kg=10.2 g dioxane/kg DEG Example 3

Standard Process, According to the Invention

Under a nitrogen blanket at room temperature, 1444 g (9.76 mol) of PA, 1386 g (13.08 mol) of DEG, 356 g (2.44 mol) of adipic acid and 429 g (6.92 mol) of EG were weighed into an apparatus according to Example 1 and stirred for hour at 140° C. The temperature was then raised to 200° C. for 3 h. 65 mg of tin(II) chloride dihydrate were then stirred in and the pressure was reduced to 400 mbar. Over a further 5 hours the pressure was reduced continuously to a final value of 60 mbar. The reaction was brought to completion in a total operating time of 32 h at 110 mbar. Distillates were collected throughout the reaction in a receiver cooled with dry ice. The amount of 1,4-dioxane formed was determined by gas chromatography: 6.9 g.

Analysis of the Polyester:
Hydroxyl number: 242 mg KOH/g
Acid number: 0.3 mg KOH/g
Viscosity: 7310 mPas (25° C.), 740 mPas (50° C.), 170 mPas (75° C.)
Amount of polyester polyol formed: 3353 g
Amount of dioxane based on the amount of polyester polyol: 6.9 g/3.353 kg=2.1 g dioxane/kg polyester
Amount of dioxane based on the amount of DEG used: 6.9 g/1.386 kg=5.0 g dioxane/kg DEG

TABLE 1

Examples 1(C) to 3 for the production of polyester polyols using 20 ppm of tin(II) chloride dihydrate as catalyst in each case

| | | Ex. | | |
|---|---|---|---|---|
| | | 1(C) | 2(C) | 3 |
| Phthalic anhydride | [mol] | 9.71 | 9.71 | 9.76 |
| | [g] | 1437.1 | 1437.1 | 1444.5 |
| Diethylene glycol | [mol] | 16.39 | 16.39 | 13.08 |
| | [g] | 1737.3 | 1737.3 | 1386.5 |
| Adipic acid | [mol] | | | 2.44 |
| | [g] | | | 356.2 |
| Ethylene glycol | [mol] | | | 6.92 |
| | [g] | | | 429 |
| Ratio (DEG/PA) | [mol/mol] | 1.69 | 1.69 | 1.34 |
| Proportion (DEG + PA) | [wt. %] | 100 | 100 | 78.3 |
| Hydroxyl number | [mg KOH/g] | 238 | 234 | 242 |
| Acid number | [mg KOH/g] | 1.7 | 1.6 | 0.3 |
| Max. reaction temperature | [° C.] | 215 | 200 | 200 |
| Operating time | [h] | 26 | 27 | 32 |
| Dioxane, found | [g] | 34.3 | 17.6 | 6.9 |
| Weight of ester, theoret. | [g] | 3000 | 3000 | 3353 |
| Weight of ester, without dioxane | [g] | 2965 | 2982 | 3346 |
| Dioxane/kg ester | [g dioxane/kg ester] | 11.56 | 5.92 | 2.06 |
| Dioxane/kg DEG | [g dioxane/kg DEG] | 19.73 | 10.16 | 4.96 |
| Viscosity (at 50° C.) | [mPas] | 900 | 930 | 740 |

Examples 1(C) and 2(C) in Table 1 show that a lowering of the reaction temperature from 215 to 200° C. already brings about a substantial improvement in respect of the amount of dioxane formed: the amount of dioxane formed falls from 11.56 g to 5.92 g per kg of ester or from 19.73 g to 10.16 g per kg of DEG used. However, this improvement is far exceeded in Example 3 according to the invention, where values of approx. 4.6 g of dioxane per kg of ester, or 7.92 g of dioxane per kg of DEG used, could be expected just from the dilution effect—78.3% of this ester consists of DEG and PA—whereas the values found are advantageously only 2.06 or 4.96, respectively.

Raw Materials for Rigid Foams:
 a.) Polyester of Ex. 1(C), 2(C) and 3
Foam Additive, Consisting of b.)-f.):
 b.) TCPP, tris(1-chloro-2-propyl)phosphate from Lanxess
 c.) TEP, triethyl phosphate from Levagard
 d.) Additive 1132 from Bayer MaterialScience.
 e.) PET V 657, trifunctional polyether polyol of molecular weight approx. 660 Da. from Bayer MaterialScience AG
 f.) Stabilizer, polyether polysiloxane copolymer from Evonik
 g.) Activator, Desmorapid VP.PU 30HB13 from BMS
 h.) Desmodur VP.PU 44V70L, polyisocyanate from Bayer MaterialScience

TABLE 2

Formulations for rigid foams:

| | | 4(C) | 5(C) | 6 |
|---|---|---|---|---|
| Polyester polyol from Ex. 1(C) | [parts] | 63.8 | | |
| Polyester polyol from Ex.2(C) | [parts] | | 63.8 | |
| Polyester polyol from Ex. 3 | [parts] | | | 63.8 |
| Foam additive | [parts] | 36.2 | 36.2 | 36.2 |
| Pentane | [parts] | 15.8 | 15.5 | 15.6 |
| Activator | [parts] | 6.0 | 4.7 | 4.7 |
| Desmodur 44V70L | [parts] | 165 | 159.0 | 160 |
| Properties of the rigid foams: | | | | |
| Fire classification/flame height | [mm] | Cl. 5/100-110 | Cl. 5/100-120 | Cl. 5/100-120 |
| Adhesion | [N] | 30 | 30 | 40 |
| Imperfection | | low | low | low |
| Hardness | | 5 | 5 | 8 |
| Core temperature | [° C.] | 161 | 160 | 155 |

On the laboratory scale, all the raw materials of the rigid foam formulation, except the polyisocyanate component, are weighed into a cardboard beaker, brought to a temperature of 23° C. and mixed with a Pendraulik laboratory mixer (e.g. type LM-34 from Pendraulik) and any volatilized blowing agent (pentane) is replaced. The polyisocyanate component (also brought to a temperature of 23° C.) was then added to the polyol mixture, with stirring, the whole was intimately mixed and the reaction mixture was poured into moulds lined with a metal facing (Corus). The foam hardness was determined by an indentation method after 2.5 minutes and the maximum bore temperature was determined after 8-10 minutes. The reaction was allowed to continue for at least another 24 hours at 23° C. and the following properties were then determined:
 Fire: BVD test corresponding to the basic test of the Swiss Vereinigung kantonaler Feuerversicherungen for measuring the degree of combustibility of building materials, in the 1988 edition with the 1990, 1994, 1995 and 2005 supplements (obtainable from Vereinigung kantonaler Feuerversicherungen, Bundesstr. 20, 3011 Bern, Switzerland)
 Adhesion: Determined by peeling the facing away from the foam and measuring the force required with a spring balance
 Imperfection: Visual assessment of void formation, the different categories being "none, low, moderate and high"

The invention claimed is:
1. A process for the production of a polyester polyol, comprising
 (I) mixing
  at least one carboxylic acid anhydride (A), and diethylene glycol (B), with (1) at least one $C_2$-$C_4$ glycol (C) other than diethylene glycol, and at least one aliphatic $C_5$-$C_{12}$ dicarboxylic acid (D), or (2) at least one $C_5$-$C_{10}$ glycol (E) and at least one $C_4$ dicarboxylic acid (F), wherein the molar ratio of component (B) to (A) is in the range 1.5:1-1.1:1, and the proportion by weight of components (A) and (B), based on the weight of all the components of the mixture, is in the range 66-95 wt. %, and (2) reacting the mixture to form a polyester polyol.

2. The process according to claim 1, wherein said carboxylic acid anhydride (A) is selected from the group consisting of phthalic anhydride, trimellitic anhydride and pyromellitic anhydride.

3. The process according to claim 1, wherein said $C_2$-$C_4$ glycol (C) is selected from the group consisting of ethylene glycol, 1,3-propanediol, 2-methyl-1,3-propanediol and 1,2-propanediol.

4. The process according to claim 1, wherein said aliphatic $C_5$-$C_{12}$ dicarboxylic acid (D) is selected from the group consisting of glutaric acid, adipic acid, pimelic acid, suberic acid, azelaic acid, sebacic acid, undecanedioic acid and dodecanedioic acid.

5. The process according to claim 1, wherein said $C_5$-$C_{10}$ glycol (E) is selected from the group consisting of 1,5-pentanediol, 3-methyl-1,5-pentanediol, 1,6-hexanediol and 1,8-octanediol.

6. The process according to claim 1, wherein said $C_4$ dicarboxylic acid (F) is selected from the group consisting of succinic acid, fumaric acid and maleic acid.

7. The process according to claim 1, wherein the molecular weight of the resultant polyester polyol is in the range 750-350.

8. The process according to claim 1, wherein the OH number of the resultant polyester polyol is in the range 150-320 g KOH/kg.

9. The process according to claim 1, wherein the viscosity of the resultant polyester polyol is in the range 400-3000 mPas, at a temperature of 50° C.

10. The process according to claim 1, wherein the proportion by weight of components (A) and (B), based on the weight of all the components of the mixture, is in the range 70-85 wt. %.

11. The polyester polyol produced by the process of claim 1.

12. A process for the production of a PUR or PIR foam, comprising the following steps:

(1) reacting a) a polyester polyol prepared according to claim 1, with b) a component containing polyisocyanate, c) a blowing agent, d) one or more catalysts, and e) optionally flameproofing agents and/or other auxiliary substances and additives.

13. The PUR or RR foam produced by the process according to claim 12.

14. A metal composite element comprising at least two facings made of metal and a core layer of foam, wherein the core layer of foam comprises the PUR foam or the PIR foam of claim 13.

* * * * *